United States Patent [19]

Rinehart

[11] Patent Number: 4,515,340

[45] Date of Patent: May 7, 1985

[54] TAXIDERMY MANNIKIN MOLD WITH RECESSES FOR SUPPORTING ARTIFICIAL EYES

[76] Inventor: John R. Rinehart, 3232 McCormick Dr., Janesville, Wis. 53545

[21] Appl. No.: 570,227

[22] Filed: Jan. 12, 1984

Related U.S. Application Data

[62] Division of Ser. No. 363,263, Mar. 29, 1982, Pat. No. 4,432,919.

[51] Int. Cl.$^3$ .............. B29D 27/04; B29D 3/00; B22D 19/04
[52] U.S. Cl. .............. 249/96; 264/46.4; 264/46.9; 264/271.1; 264/275; 425/123
[58] Field of Search .......... 425/123; 249/96; 264/275, 46.4, 46.9, 271.1

[56] References Cited

U.S. PATENT DOCUMENTS

| | | | |
|---|---|---|---|
| 469,345 | 2/1892 | Devantery | 425/123 |
| 1,502,272 | 7/1924 | Sayre | 249/96 X |
| 2,094,823 | 10/1937 | Sample | 425/123 |
| 2,887,746 | 5/1959 | Bogoff | 249/96 X |
| 3,106,040 | 10/1963 | Ostrander | 264/310 X |
| 3,112,163 | 11/1963 | Alderfer | 264/46.4 |
| 3,210,453 | 10/1965 | Smith | 425/123 X |
| 3,432,581 | 3/1969 | Rosen | 264/45.7 X |
| 3,889,913 | 6/1975 | Stoeberl | 249/96 X |
| 4,288,903 | 9/1981 | Matsuda et al. | 264/46.4 X |
| 4,432,919 | 2/1984 | Rinehart | 264/46.4 |

OTHER PUBLICATIONS

*Specializing in Forms for White Tail Deer*, Granite Quarry, North Carolina 28072, Catalog No. 8, 1982-1983, 40 pp.
*Bob's Taxidermy Supplies*, Bob's Taxidermy Supplies, 427 S. Harbor Blvd., Fullerton, CA. 92632, Price List: Aug. 12, 1983, 65 pp.

*Primary Examiner*—Philip Anderson
*Attorney, Agent, or Firm*—Isaksen, Lathrop, Esch, Hart & Clark

[57] ABSTRACT

Disclosed is a taxidermy mannikin mold and molding method for making a mannikin which has eyes insert-molded therein in proper position and rotational orientation and which has proper eye-surrounding anatomical surface features. The mold cavity has therein eye socket recesses each of which is immediately surrounded by a correctly contoured surface having reference indicia marking.

3 Claims, 8 Drawing Figures

TAXIDERMY MANNIKIN MOLD WITH RECESSES FOR SUPPORTING ARTIFICIAL EYES

This is a division, of application Ser. No. 363,263, filed March 29, 1982 now U.S. Pat. No. 4,432,919.

BACKGROUND OF THE INVENTION

Taxidermists mount animal head skins over molded animal head mannikins, such as deer head mannikins, and secure the result to a wall plaque or the like for use as a trophy.

Currently, these molded mannikins, usually of light-weight polyurethane foam material, do not have artificial eyes attached thereto. These mannikins have very large eye socket cavities into each of which the taxidermist must: mount centrally therein the artificial eye; make and mount eye-surrounding anatomy contour features, usually of modeling clay; and, if the eye is of the elongated pupil type, such as with deer, rotate the eye to a proper orientation for correct and natural appearance. The positioning and securing of the eye in correct position, and the forming of the correct eye-surrounding anatomical contour features, is demanding of considerable time and skill.

This invention provides a mold and molding method for making a molded animal head mannikin which has the eyes insert-molded therein in correct position and rotational orientation and has correct eye-surrounding anatomy features, all as an integral part of the molded mannikin.

SUMMARY OF THE INVENTION

A summary description is set forth in the Abstract of the Disclosure and reference is to be had thereto.

An object of the invention is to provide a mold and molding method for producing taxidermy animal head mannikins with the eyes and the eye-surrounding anatomy as part of the mannikin when it comes out of the mold, so that the taxidermist need not spend time and skill positioning or mounting the eyes, or filling in and contouring around the eyes to provide correct anatomical eye-surrounding features.

DETAILED DESCRIPTION OF THE SHOWN EMBODIMENT

Figure 1:
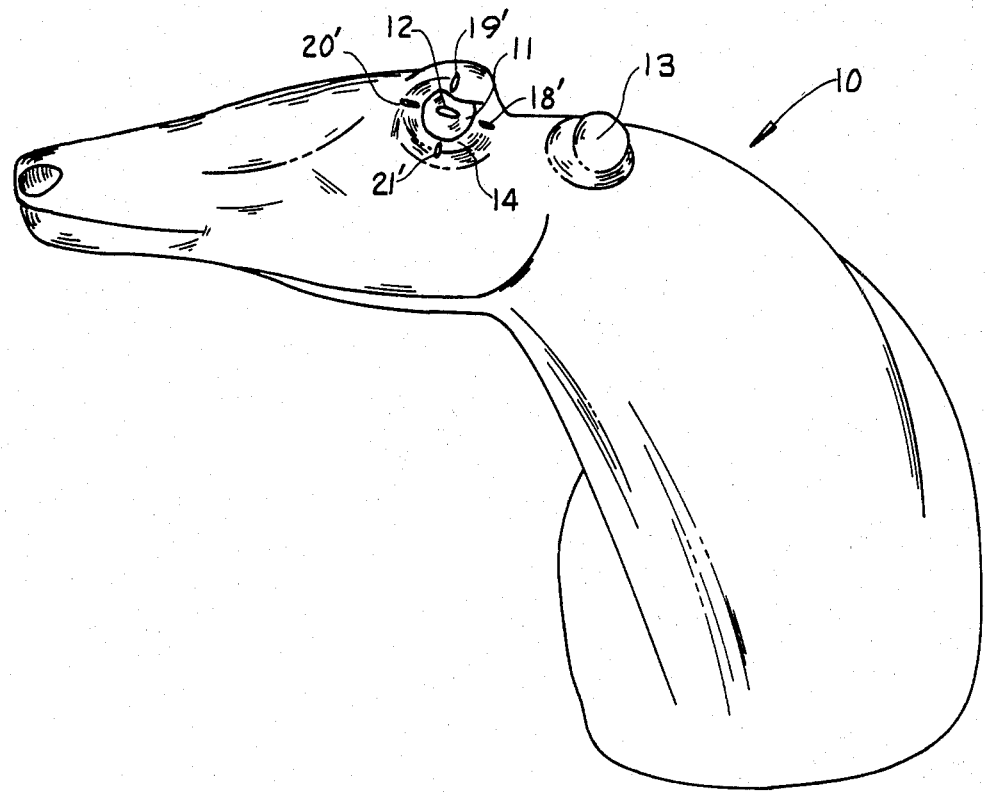
FIG. 1 is a view of a mannikin made in accordance with the invention.

Referring to the drawing, in FIG. 1 there is shown a deer head mannikin 10 molded in accordance with this invention of light-weight polyurethane foam material, having insert-molded therein an artificial eye 11 which has an elongated pupil 12. The mannikin has correct deer head anatomical features including the ear stump indicated at 13 and the eye-surrounding features indicated at 14.

Figure 2:
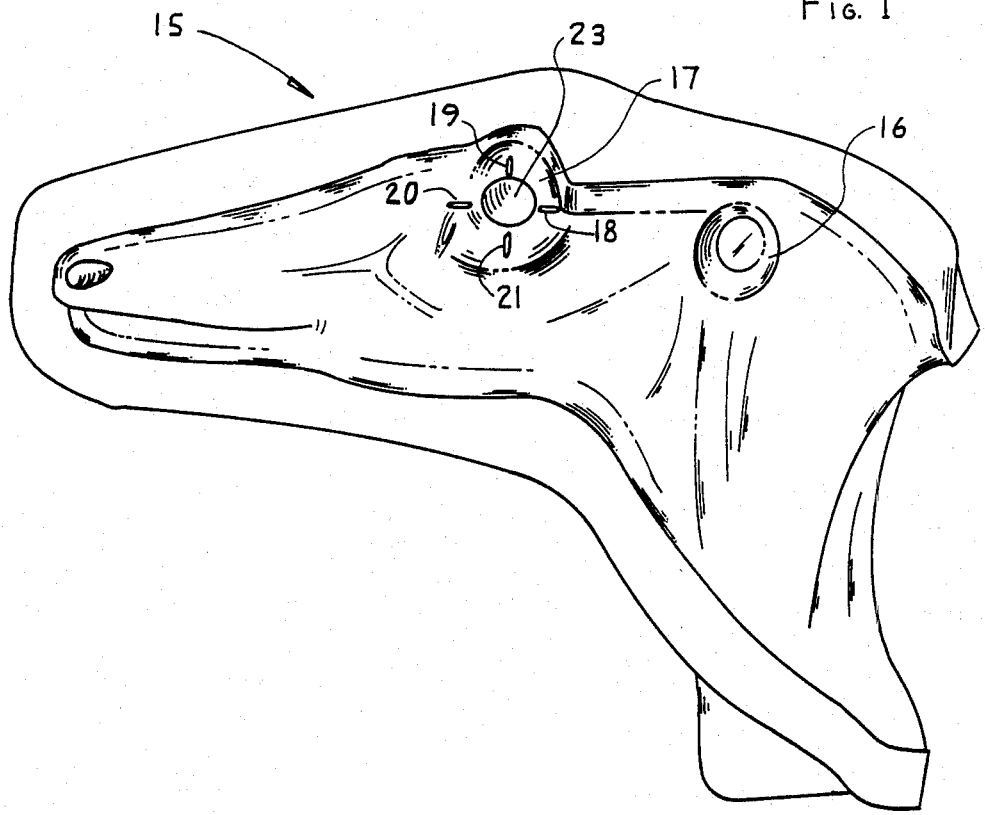
FIG. 2 is a view of the inside of one of the half parts of a mold made in accordance with the invention.
Figure 3:
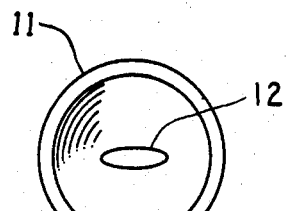
FIG. 3 is a rear elevation view of an artificial eye used in carrying out the invention.
Figure 4:
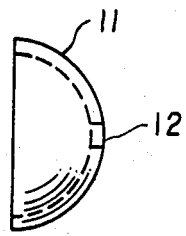
FIG. 4 is a side elevation view of the eye.
Figure 5:
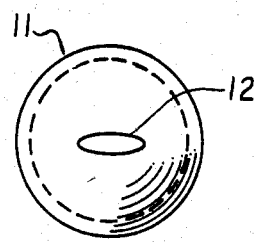
FIG. 5 is a front elevation view thereof.
Figure 6:
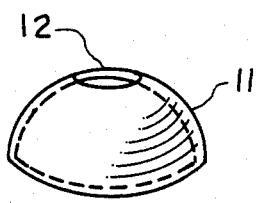
FIG. 6 is a perspective view thereof.

In FIG. 2 there is shown the right side half part 15 of a mold for forming the mannikin 10, the part 15 having an ear stump recess 16 in the cavity surface thereof and a semi-spherical eye socket recess 23 in said surface. The cavity surface is contoured to correctly form all features of the mannikin including the features immediately surrounding the eye, and, accordingly, the cavity surface is so contoured as indicated at 17 in FIG. 2 to provide the correct features indicated as 14 in FIG. 1. In the eye socket surrounding area 17 of the mold part there are ridges 18, 19, 20 and 21 which serve as indicia markings to facilitate properly positioning the eye in the eye socket recess. These ridges 18, 19, 20 and 21 produce, in the molding process, grooves 18', 19', 20' and 21' on the mannikin as shown in FIG. 1.

FIGS. 3, 4, 5 and 6 show an artificial deer eye 11 having an elongated pupil 12. The eye is of glass or plastic and is a semi-spherical shell having its concavity in the rear side thereof.

Figure 7:
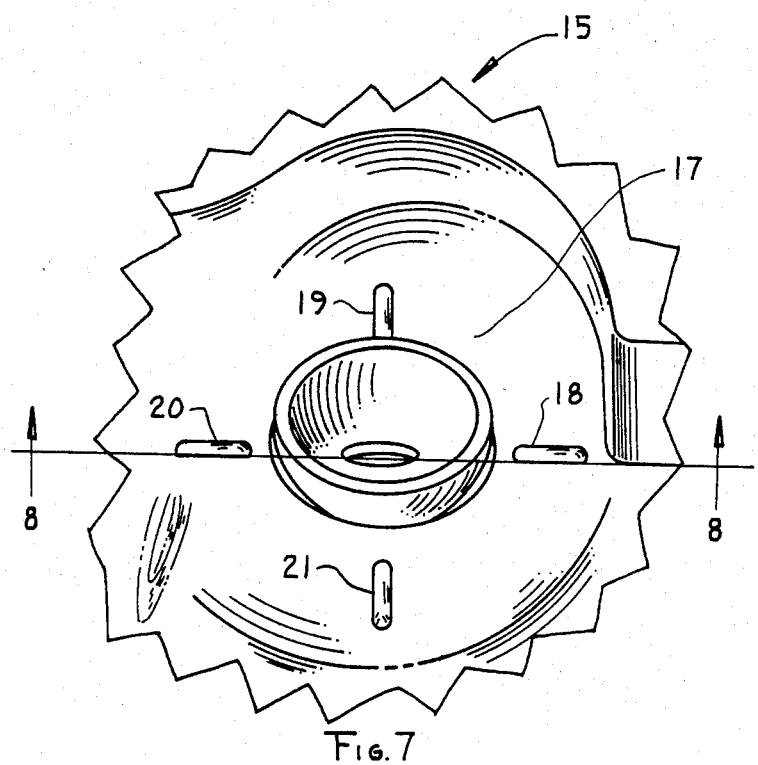
FIG. 7 is an enlarged view of a portion of the mold shown in FIG. 2, but showing the artificial eye inserted therein in proper position.

FIG. 7 shows an eye placed in the eye socket recess, in proper rotational orientation, with the elongated pupil's long axis aligned with ridges 18 and 20. The ridges 18, 19, 20 and 21 are shown equidistantly spaced about the perimetrical edge of the eye socket recess, with ridges 18 and 20 aligned with the long axis of the elongated pupil of the eye, and ridges 19 and 21 aligned with the short axis of that pupil.

Figure 8:
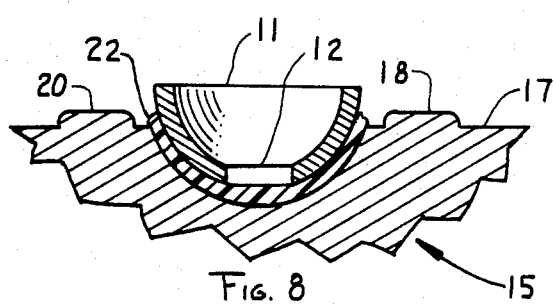
FIG. 8 is a section view taken on line 8—8 of FIG. 7.

FIG. 8 shows eye 11 inserted into the eye socket recess with eye 11 rotationally oriented so that elongated pupil 12 is aligned with ridges 18 and 20, and with eye 11 held in the recess by an adhesive 22, which adhesive may be removed from the front of the eye after removing the molded mannikin from the mold.

It will be appreciated that the invention is carried out by providing in each of two half mold cavity parts a small eye socket recess to snugly receive the front portion of the artificial eye, leaving the rear portion thereof projecting into the mold cavity, and by providing in each mold cavity part a correct sculpted or contoured suface of anatomical features immediately around the small eye socket recess right up to the edge thereof, and by providing, in that eye socket recess surrounding area, reference indicia marking to facilitate correct rotational positioning of the eye in the eye socket recess for correct directional orientation of the long axis of the elongated pupil of the eye. When inserting the eye into the eye socket recess and rotationally positioning it therein, one may use a removable (cleanable) adhesive which will hold the eye correctly during the molding operation, and which will be removable (cleanable) from the front of the eye after the molding operation. With eyes inserted into, properly positioned and held in each of the half mold parts, the half parts are then closed together to form the full mold; and the mannikin is then molded by pouring into the mold cavity a liquid polyurethane foaming material, allowing it to foam expand and harden. The material surrounds the rear portion of the eyes and enters the concavities thereof so as to lock the eyes securely in the mannikin. When the two half parts of the mold are separated, the resulting mannikin coming out of the mold has the eyes properly positioned in all respects, rotationally and otherwise, and has correct eye-surrounding anatomical features.

The taxidermist using mannikins produced in accordance with this invention may proceed to mount the animal skin over the mannikin, mounting the skin over the properly contoured surface including the eye-surrounding area right up to the perimeter of the eye itself. The taxidermist need not do anything to position the eye, and need not build up eye-surrounding surface to properly back up the skin.

What is claimed is:

1. A mold for forming a taxidermy animal head mannikin with artificial eyes molded therein in proper position, comprising:
   a pair of mold cavity half parts, each of the half parts having:
   a cavity surface contoured for correct anatomical formation of features of half of the mannikin including the features immediately surrounding the eye;
   a semi-spherical eye socket recess in the cavity surface shaped for snugly receiving the front portion of an artificial eye and leaving the rear portion projecting into the mold cavity with the surface of the mold cavity having correctly contoured anatomical features right up to the edge of the eye socket recess; and
   reference indicia in the cavity surface near the edge of the eye socket recess comprising at least two indicia markings on opposite sides of the eye socket recess, whereby an artificial eye may be inserted in the eye socket recess and correctly positioned by aligning the pupil of the eye with the indicia markings prior to introducing liquid foamable hardenable material into the cavity between the mold half parts.

2. The mold of claim 1 wherein said indicia markings comprise a plurality of marks equidistantly spaced about the edge of said recess.

3. The mold of claim 2 wherein the indicia markings comprise four raised ridges spaced equally about each eye socket recess, whereby an artificial eye with an elongated pupil may be inserted in the eye socket recess and correctly positioned by aligning the long axis of the pupil with two of the indicia ridges which are on opposite sides of the eye socket recess and aligning the short axis of the pupil with the other two indicia ridges prior to introducing liquid foamable hardenable material into the cavity between the mold half parts.

* * * * *